May 11, 1954   T. A. FEENEY ET AL   2,678,179
HYDRAULIC TRIM CONTROL

Filed Jan. 24, 1949   4 Sheets-Sheet 2

INVENTORS
THOMAS A. FEENEY
BY EUGENE V. BROWNE
Herbert E. Metcalf
Attorney

May 11, 1954     T. A. FEENEY ET AL     2,678,179
HYDRAULIC TRIM CONTROL Filed Jan. 24, 1949     4 Sheets-Sheet 3

INVENTORS
THOMAS A. FEENEY
BY EUGENE V. BROWNE

Herbert E. Metcalf
Attorney

Patented May 11, 1954

2,678,179

UNITED STATES PATENT OFFICE 2,678,179

HYDRAULIC TRIM CONTROL

Thomas A. Feeney and Eugene V. Browne, Los Angeles, Calif., assignors to Northrop Aircraft, Inc., Hawthorne, Calif., a corporation of California Application January 24, 1949, Serial No. 72,412

22 Claims. (Cl. 244—83)

The present invention relates to airplane control systems, and more particularly to an airplane control system wherein trim can be achieved by adjustment of the relation between a pilot's control column and a restoring force producing mechanism, so that trim can be achieved by the use of the control surfaces themselves, without the application of pilot force.

In high speed airplanes, particularly multimotored pursuit or combat types, frequently only a single pilot is available to handle the controls of the airplane. Due to the ever increasing use of instruments additional to engine condition indicators, such as radar for example, the trimming of the airplane quickly and efficiently becomes a major task for the pilot, particularly for sudden out-of-trim moments that might take place while the pilot's attention is otherwise directed. The usual sequence of pilot response to an out-of-trim moment is, first, the use of the normal controls by manual application of control column and rudder pedal forces, and then the operation of various trim tabs until trim is restored, thus releasing the pilot from maintaining the control forces.

The customary trimming procedure, however, entails operation of one or more of the trim control elements for elevation, direction, and lateral trim by the pilot as may be needed, which distracts the pilot's attention from what might well be other important operations. It is, therefore, an object of the present invention to provide a quick and efficient centralizing and trim system that will normally centralize the controls, automatically maintain trim and, in addition, will remove control element trim forces from the pilot with only momentary attention by the pilot. Another object of the invention is to provide a trim system utilizing the normal airplane control surfaces which may, if desired, be completely power operated.

When control surfaces are full power actuated, as, for example, by a hydraulic servomotor, the pilot cannot "feel" any of the aerodynamic forces acting on the control surfaces. In consequence, it is customary when the surfaces are full power operated to utilize balanced elastic restoring forces applied to the control column and rudders so that the control column neutral as determined by the applied elastic forces substantially corresponds to the normal operating neutral position of the control surface with power operated controls, which require very low column forces for operation, and which do not feed back surface loads to the control column. A shift in the point of application of the restoring forces to the control column will shift the column position and, in consequence, the position of the controlled surfaces. When this shift is made to counteract an out-of-trim moment the airplane will be held in trim position and the control column can then be operated as usual from the new neutral position. If and when the out-of-trim moment disappears, the control column can be restored to its original neutral. It is another object of the present invention to provide a simple and effective means and method of changing the control column neutral as desired by an airplane pilot, in order to trim the airplane.

In a companion application, Serial No. 24,226, filed April 30, 1948, now Patent No. 2,639,108, May 19, 1953, Feeney and Hall have shown, described and claimed an automatic trim system for airplane control surfaces wherein an adjustable link is changed in length to change the relationship between the control column and the restoring force producing mechanism. The length of the link, in the preferred embodiment of the invention shown and described, is changed electrically under the control of the pilot, utilizing electrical power from a source such as a battery or engine driven generator. It is another object of the present invention to provide a means and method of adjusting the linkage between a restoring force producer and the control column and control surfaces, that does not require an external source of power, and which will, in consequence, be operative at all times.

Our invention can be more fully understood by reference to the drawings, in which one preferred embodiment of the present invention is shown as applied to a stick type control of two surfaces movable in the same direction for elevation control and in opposite directions for roll control, these surfaces being shown as elevons.

Figure 1:
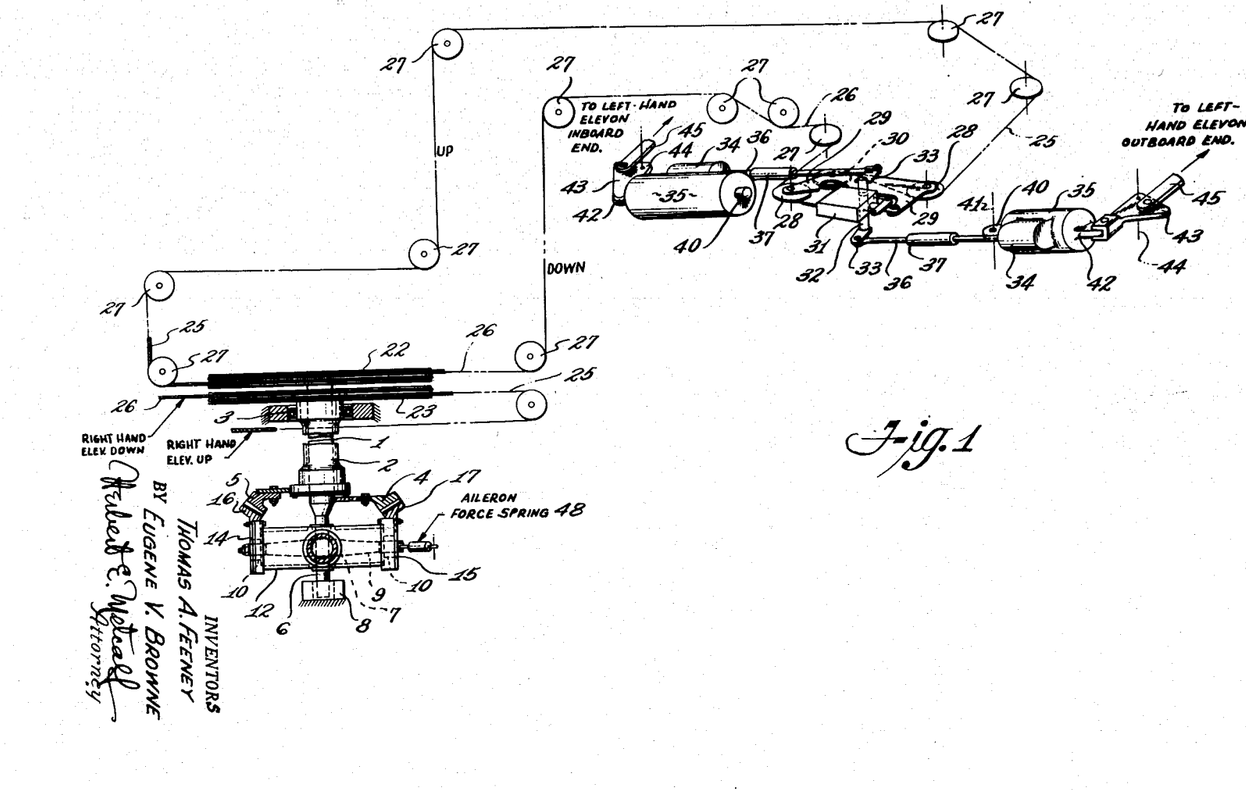
Figure 1 is a perspective diagrammatic view partially top sectional, showing a control stick system as connected to operate the elevons of an airplane, the cable connections and operating motors of only one elevon being shown.
Figure 2:
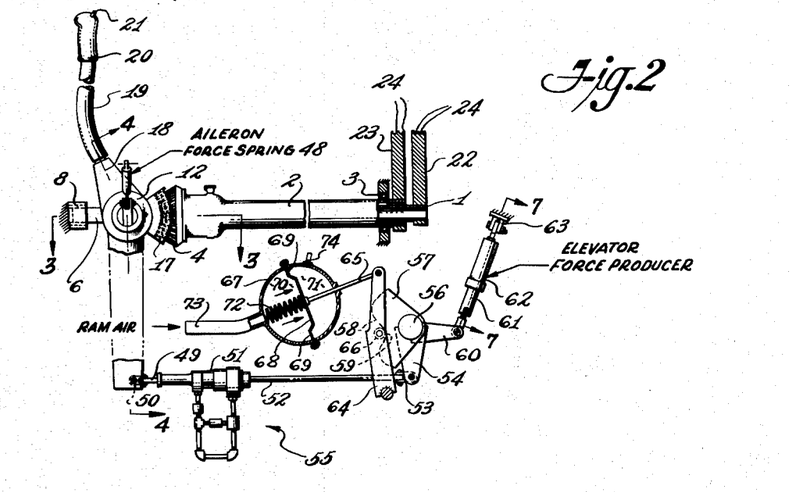
Figure 2 is a side view partly in section and partly diagrammatic, of the elevator and aileron stick motion combining mechanism, showing also the elevator stick-force producer used in the system of Figure 1.

Referring first to Figures 1 and 2, a pair of concentric torque tubes 1 and 2 are mounted for independent rotation on a fore-and-aft axis in the airplane on tube bearings 3. The inner tube 1 extends beyond the forward end of the outer tube 2 and carries a laterally extending inner tube gear sector 4, and the forward end of outer tube 2 is provided with a similar outer tube gear sector 5 extending laterally opposite the inner tube gear sector 4.

Figure 3:
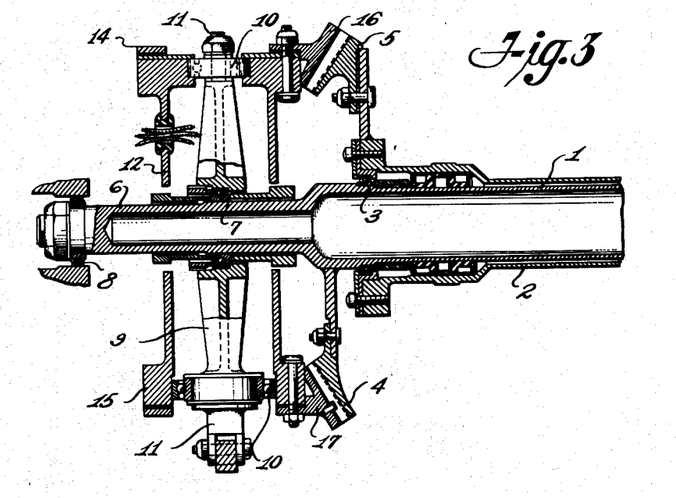
Figure 3 is an enlarged top sectional view showing the control stick mounting bearings, taken as indicated by broken line 3—3 in Figure 2.
Figure 4:
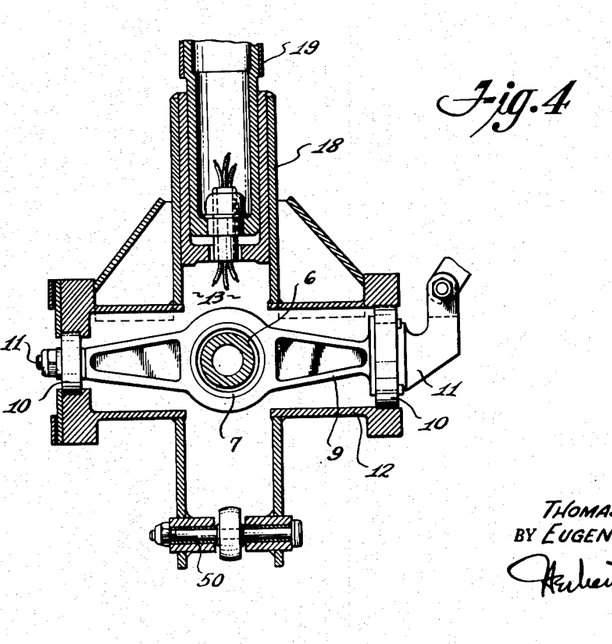
Figure 4 is an enlarged cross-sectional view showing the control stick attachments, taken as indicated by broken line 4—4 in Figure 2.

The inner tube 1 is extended forwardly to form a stub shaft 6 of smaller diameter than the inner tube 1 and a stick bearing 7 is mounted on the stub shaft 6 for free rotation thereon. The forward end of stub shaft 6 rotates in a stub shaft bearing 8 attached to the airframe. As shown in Figures 3 and 4, a cross shaft 9, normally horizontal, is mounted on stick bearing 7 and shaft end bearings 10, 10 are attached to cross shaft 9 by opposite cross shaft pins 11, the axes of which are substantially in a horizontal plane perpendicular to the stub shaft 6. A stick yoke 12 is rotatably mounted around the cross shaft 9 by means of the shaft end bearings 10. This yoke 12 also encircles the stub shaft 6, with a space 13 provided to permit a rotation of the yoke 12 on shaft bearings 10 of about 45° or more. Thus, the yoke 12 when assembled can rotate in a transverse vertical plane on stick bearing 7 and in a fore-and-aft vertical plane on shaft bearings 10 either with single or combined rotations.

Opposite sides 14 and 15 of the yoke 12 near the ends of the cross shaft 9 are respectively fixed to an outer tube pinion 16 and an inner tube pinion 17, these pinions meshing respectively with the outer tube gear sector 5 and the inner tube gear sector 4.

The upper part of the yoke 12 around the cross shaft 9 and stub shaft 6 forms a socket 18 into which is pressed and locked a pilot's control stick 19. A stick handle 20 at the top of the control stick 19 is provided with a momentary-contact trim switch button 21, as shown in Figure 2.

The aft ends of the inner and outer torque tubes 1 and 2 are respectively connected to elevon cable quadrants 22 and 23 provided with cable grooves 24 in their arcuute surfaces. An elevon up cable 25 and an elevon down cable 26 are each attached at opposite ends of each quadrant cable groove 24 and, following one pair of cables as shown for the left-hand elevon control, lead over cable pulleys 27 to pass around lever pulleys 28 mounted on the end of a valve control lever 29. The elevon up cable 25 passes around an idler pulley 30 also mounted on control lever 29 and then terminates in a tension regulator 31 mounted on control lever 29. The elevon down cable 26 enters the tension regulator directly from the opposite lever pulley.

Control lever 29 is mounted on a lever shaft 32 having top and bottom valve arms 33, each connected to operate a hydraulic servo valve spool (not shown) in a servo valve casing 34 attached to a hydraulic actuating cylinder 35, through a spring rod 36 having a two-way spring (not shown) enclosed in a spring casing 37.

As both hydraulic motors are alike except for being reversed in position, the identical parts of each will be given identical numbers and the connections of only one motor will be described.

An actuating piston rod 40 attached to a piston (not shown) inside the hydraulic actuating cylinder 35 is rotatably attached to the airframe by a rod bracket 41 to extend substantially parallel to spring rod 36. The hydraulic actuating cylinder 35 is attached by cylinder bracket 42 to a bellcrank 43 mounted to rotate on axis 44, this bellcrank being connected by link 45 extending beyond the airframe to rotatably connect with the elevon (not shown) beneath the axis of rotation thereof. It will be noted that the two motors are connected through the elevon structure. The type of full power control surface operating system described briefly herein is more fully shown, described and claimed in the co-pending application of Feeney, Serial No. 23,567, filed April 27, 1948.

The operation of the controls so far described and without considering the elevator centralizing or trimming system later to be described, is as follows:

The stick 19, for example, when moved aft without lateral motion thereof, rotates both pinions 16 and 17 in the same direction, and due to the tooth mesh with the respective inner and outer tube gear sectors 4 and 5 will rotate the attached torque tubes in opposite directions to actuate the elevon up cables from both quadrants 22 and 23.

These cables then through control lever 29, valve arms 33 and spring rods 36 will move the spools in each hydraulic valve casing 34 to apply hydraulic fluid under pressure to the proper side of the hydraulic actuating piston to move the actuating cylinders in a direction to move the elevons on both sides of the airplane center line upwardly. As the elevons move, however, they move the actuating cylinder in the same direction as the original spool movement, until the flow to the actuating cylinder is shut off. A similar action takes place when the stick is moved forward to actuate the elevon down cables, whereupon the elevon will be moved downwardly. As the actuating cylinders and valves are moved with the surface, and the spool is moved only by the control stick, the surfaces follow all stick movements, move upwardly or downwardly in accordance with the amount of stick movement, but transmit no significant air loads to the stick as the only connection between the surfaces and the control system is by way of the spool friction, which is, of course, negligible as compared even to friction forces in the system.

As two actuating cylinders are directly connected together through the elevon, it is desirable that one valve of each pair of cylinders remain operable if the other valve should jam, consequently, the spring rods 36 are provided so that the rod attached to operate the jammed valve can elongate or shorten to permit operation of the other valve. Normally, spring rods 36 operate as solid rods as far as valve operation is concerned.

Returning to the description of stick operation, when the stick 19 is rocked laterally, the pinion on one side will be moved downwardly and the pinion on the other side will be moved upwardly, carrying the gear sectors with them, thus rotating both torque tubes 1 and 2 together and in the same direction. This rotation will cause the quadrants to move together, thereby operating the up cable to one pair of hydraulic motors, and the down cable to the other pair of hydraulic motors, the result being to move one elevon up and the other elevon down for roll control.

As both elevation and roll control stick motions can take place simultaneously, the corresponding movements of the elevons take place simultaneously and full control in elevation and roll is obtained.

Stick centralizing forces are applied in aileron movements of the stick by a two-way aileron centralizing spring 48 extending from one end of the cross shaft 9 to the airframe. In the system shown, these forces are not adjustable in strength or in application point.

Centering forces are applied to the stick in elevation directions by the use of a trim rod 49 rotatably attached to the lower part of the stick yoke 12 under the stub shaft 6 by trim rod bearing 50 and extending aft to attach to a floating hydraulic trim cylinder 51 whose trim piston rod 52 is also extended further aft to end in a universal motion bearing 53 carried on a spoke 54, this entire combination forming an extensible link 55. The detailed construction and operation of trim cylinder 51 will be described later.

Spoke 54 is attached to a trim shaft 56, mounted on bearings on each side of torque tubes 1 and 2 with the trim shaft rotational axis crossing the projected rotational axis of torque tubes 1 and 2 at a right angle.

A cam sector 57 is mounted on one end of trim shaft 56 with a cam surface 58 facing forward, the cam having a central indent portion 59 of minimum radius and side portions of greater radii. Opposite the indent 59 of the cam, the trim shaft carries a force lever 60 rotatably connected to a spring operating rod 61 entering an elevator force producer cylinder 62 attached to the airframe by support 63 and held in a substantially vertical plane. The detailed construction of the force producer will be later described.

In front of cam sector 57 a cam lever 64 is rotatably attached below to the airframe, and extends upwardly to rotatably connect to a bellows rod 65 extending forwardly. Cam lever 64, between its ends, also carries a cam follower 66 rolling on cam surface 58 so that pressure on bellows rod 65 directed aft will force the cam follower 66 into the central indent portion 59 of cam surface 58 and thus rotate trim shaft 56 if the cam follower is not in the indent portion.

In flight, the force on bellows rod 65 is supplied by the dynamic air flow by means of a bellows casing 67 preferably spherical and containing a diaphragm 68 attached to the casing 67 by flexible edges 69, this diaphragm dividing the casing into a pressure chamber 70 and a static chamber 71. Bellows rod 65 extends through the casing 67, and diaphragm 68 is attached at a right angle thereto inside the casing 67. A light diaphragm spring 72 presses the diaphragm aft to insure contact of follower 66 with cam surface 58 when the airplane is not in flight. Pressure chamber 70 is connected by ram air tube 73 to an air scoop, for example, so that pressures in accordance with air speed can be produced in pressure chamber 70. The static chamber 71 is connected by static line 74 to a position of static or negative pressure on the outside of the airplane. The bellows action applies a synthetic feel to the control stick when moved in elevation direction. A similar device for producing synthetic feel is shown, described and claimed in the co-pending application of Ashkenas, Serial No. 52,367, filed October 1, 1948, now abandoned. The device is valuable in airplanes having full powered control surfaces, as the aerodynamic forces are reduced as the airplane approaches a stall. The pilot can feel this reduction and thereby receives a stall warning.

Figure 7:
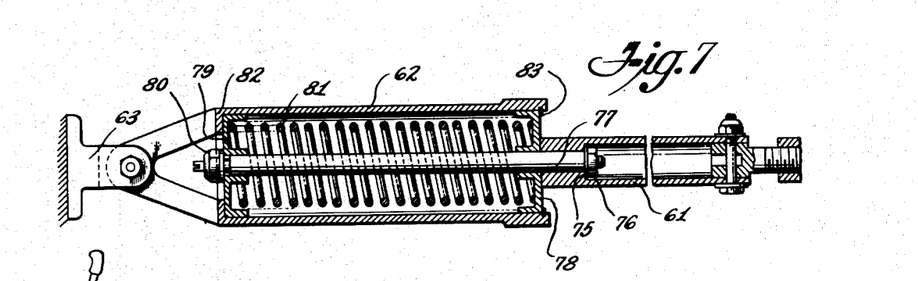
Figure 7 is a longitudinal sectional view of the restoring spring, taken as indicated by the line 7—7 in Figure 2.

One satisfactory elastic centering force producing mechanism is shown in Figure 7 and will next be described.

Spring operating rod 61 is hollow, and is provided with an end shoulder 75 which bears against an internal nut 76 on one end of a tension rod 77. Tension rod 77 passes through one spring cap 78 and then through a second and opposite spring cap 79 to terminate in a second rod nut 80. A compression spring 81, preferably preloaded, is placed between spring caps 78 and 79, and caps 78 and 79 are movable within the force producer cylinder 62, being held from leaving the cylinder at one end by cylinder end 82 and at the other end by split ring 83. The compression spring 81 is the elevator force producer. Spring operating rod 61 bears against, but is not attached to, spring cap 78.

Spring operating rod 61 acting under the control of compression spring 81 is connected to the control stick 19 through force lever 60, trim shaft 56, spoke 54, trim piston rod 52, trim cylinder 51 and trim rod 49, to hold the stick in a predetermined neutral position which normally is the position from which the attached control surfaces are moved for aerodynamic elevation control of the airplane. Thereafter, movement of the control stick either fore or aft will compress compression spring 81 to supply a restoring or centralizing force to the stick, acting as follows, considering that no change in relation of the hydraulic trim cylinder and its piston occurs.

When force lever 60 is moved toward the force producer cylinder 62, spring operating rod 61 bears against cap 78 to compress the compression spring, as the opposite cap 79 cannot move because the cylinder is fixed to the airframe. In this case, spring operating rod 61 slides over tension rod 77.

In the reverse direction, when force lever 60 is moved away from the force producer cylinder 62, shoulder 75 on spring operating rod 61 picks up internal nut 76 on tension rod 77, moves the tension rod 77 and opposite spring cap 79 to again compress the compression spring 81 to supply the restoring force.

The connection of force lever 60 to cam sector 57 is such that when the spring operating rod 61 is not compressing compression spring 81 in either direction, the cam follower 66 will be at the innermost penetration in the indent portion 59, with the force applied by the cam follower when the airplane is in flight applied radially to the cam. Thus, when the airplane is not in flight, the centering forces are applied almost entirely from the elevator force producer 81, a very small amount being supplied by the diaphragm spring 72 which merely keeps the cam follower in the indent when the airplane is at rest. In flight, however, the centering forces are supplied both from the force producer 81 and from the bellows as the cam surface 58 is rotated, the latter force providing the synthetic feel in elevation control when the stick is moved for that type of control.

As the stick, when moved fore-and-aft, rotates the torque tubes 1 and 2 in directions to provide elevation control via quadrants 22 and 23, cables 25 and 26 and actuating cylinders 35 connected to the elevons, to make the elevons move in the same direction, the length of extensible link 55 should be such that when the elevator force producer and the bellows cam mechanism determine the stick position, this position for normal flight should hold the elevons in a neutral position. When out-of-trim moments occur, the pilot will instinctively move his stick to trim the airplane, and when he does so in elevation directions both the elastic and aerodynamic restoring forces are applied to the stick necessitating the continuous application of force by the pilot, with operation of the airplane from and to this trim position for maneuvering the airplane. A change in length, however, in the proper direction, of extensible link 55 will permit both centering forces to neutralize without moving the stick, thus providing a new neutral operating position for the stick without the necessity of application of pilot force. This new position will be one in which the control surfaces will be held in a trimming position, and trim is achieved.

Figure 6:
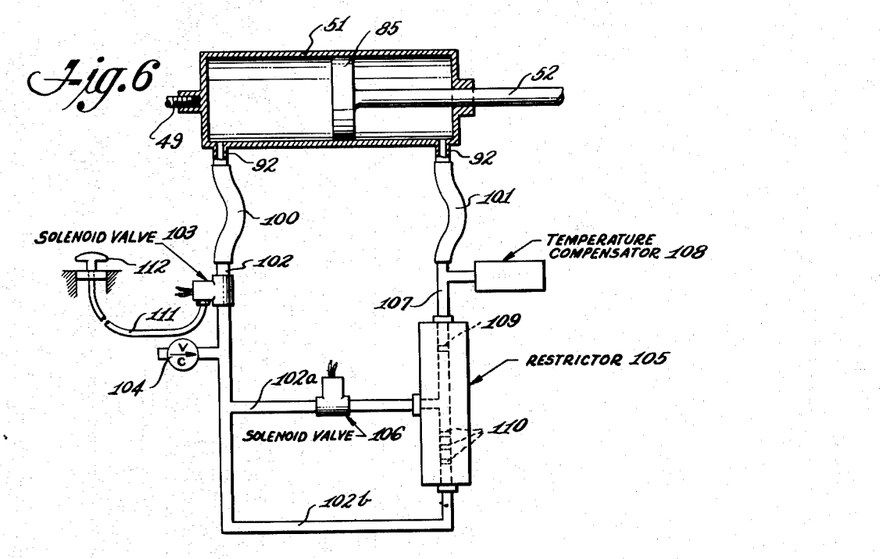
Figure 6 is a schematic diagram showing the hydraulic circuit of the elevator trim system.

One means and method of changing the length of extensible link 55 is shown in Figures 2 and 6 where the relation of the hydraulic trim cylinder 51 is changed with respect to an internal trim piston 85 attached to trim piston rod 52.

Figure 5:
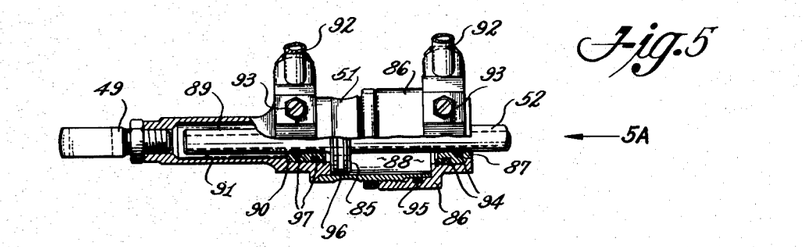
Figure 5 is a longitudinal sectional view of the trim cylinder and piston used in the force producer of Figure 2.
Figure 5A:
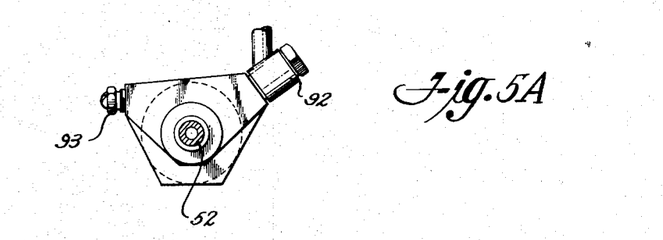
Figure 5A is an end view of the trim cylinder, viewed as indicated by the arrow 5A in Figure 5.

As shown in Figures 5 and 5A, the forward end of the trim cylinder 51 is closed and rigidly attached to the trim rod 49. At the rear end of the trim cylinder 51, a cylinder head 86 is installed, this head having a rod bushing 87 through which the trim piston rod 52 slides. Trim piston rod 52 is attached to the trim piston 85 working in a fluid chamber 88 within the trim cylinder 51. On the opposite side of trim piston 85 from its piston rod 52 is attached a dummy piston rod 89 slidable through a casing bushing 90 in a hollow cylinder passage 91. This dummy piston rod 89 has the same diameter as the trim piston rod 52 so that equal piston areas will be exposed to fluid pressure on each side of the trim piston 85.

Cylinder ports 92 are provided, one at each end of the fluid chamber 88, and bleeder valves 93 connected near the ports 92 permit the bleeding of air from both sides of the trim piston 85 to obtain a completely fluid-filled cylinder. Rod bushing seals 94 and head seal 95 prevent external fluid leakage, piston seal 96 prevents fluid leakage past the trim piston 85, and casing bushing seals 97 prevent fluid leakage to the forward end of the dummy piston rod 89.

Referring to Figure 6, flexible hydraulic fluid connections 100 and 101 are made to the ports 92 of the hydraulic trim cylinder 51. One of these connections 100 leads through pipe 102 to a pilot-operated solenoid valve 103 and then past a filler pipe and check valve 104. Pipe 102 then divides, one portion 102a leading to a restrictor 105 through a landing gear solenoid valve 106, the other portion 102b leading directly into the restrictor 105. Within the restrictor, portions 102a and 102b are joined and are connected to the other end of trim cylinder 51 by connection pipe 107 to the other connection 101. Attached to connection pipe 107 is a temperature compensator 108 to provide for expansion and contraction of the hydraulic fluid, as is known in the art.

Within restrictor 105 a single orifice 109 is positioned in connection pipe 107 to restrict the flow to a desired value. Portion 102b within the restrictor before joining with portion 102a is provided with three orifices 110, for still further flow restriction. The pilot-operated solenoid valve 103 is operated by the pilot's trim switch button 21 on the stick handle 20, as shown in Figure 2 and the landing gear solenoid valve 106 is operated by a switch conveniently placed to be closed when the landing gear of the airplane is extended for landing purposes.

As the hydraulic trim cylinder 51 is floating and moves laterally when the stick is moved for roll control purposes and fore-and-aft when moved for elevation control purposes, the connections 100 and 101 are made of high pressure flexible hose to permit easy movement of the cylinder at all times.

The hydraulic trim cylinder and piston, together with the hydraulic circuits above described, is used to change the length of the extensible link 55 to achieve trim as follows:

Assume that the airplane is flying normally with the stick in normal neutral, the elevons in normal elevation neutral and with the length of extensible link 55 such that the restoring forces applied to the stick by both the force producer 81 and the bellows 67 are zero. In this case, the trim piston 85 will be at or near the central position within trim cylinder 51. Both solenoid valves 103 and 106 are closed, and the trim piston 85 is, therefore, held in position by a hydraulic lock, due to the incompressibility of the hydraulic fluid within the limits of applied pressures. Thus, extensible link 55 acts as a solid rod, to transmit the restoring forces to the stick.

When an out-of-trim moment occurs in elevation direction, the pilot instinctively moves his stick forward or aft to trim the airplane, and in doing so, the restoring forces generated by the force producer and the bellows act on the stick, thereby applying pressure to the fluid on one side or the other of the trim piston in the hydraulic trim cylinder 51.

With the pilot holding the stick in trim position, he may then close the pilot switch button 21 opening the pilot-operated solenoid valve 103. The fluid under pressure can then flow through the three orifices 110 and the single orifice 109 into the other side of the trim piston until the pressure is equalized, thereby permitting the trim piston to move in the trim cylinder to shorten or lengthen the extensible link 55. The pressure will be equalized when the force producer and the connected bellows reach their neutral. The pilot then releases the trim switch button 21 to again lock the trim cylinder, and the stick and the surfaces controlled thereby will thereafter be held in its new position by the force mechanisms.

If the electrical system for the pilot-operated solenoid valve 103 should fail to work, provisions are made for manually opening the valve. This consists of a pull cable 111 leading from the valve 103 to an emergency valve operating handle 112 located within reach of the pilot or co-pilot. The pilot-operated solenoid valve 103 is spring-loaded to the closed position and incorporating means enabling mechanical operation.

As it is desirable that a faster trim be achieved during take-off and landing procedures, the extension of the landing gear opens the landing gear solenoid valve 106. Thereafter, when the landing gear is extended, when the pilot's switch button 21 is closed, the fluid can flow through all of the orifices, with the single orifice 109 in parallel with the three orifices 110. This allows the fluid to equalize the pressures rapidly so that the length of link 55 can be changed rapidly during the usually limited time involved in take-off and landing.

It will be noted that the trim system, as described above, is self-sufficient, i. e., needs no motor or source of fluid under pressure. The forces required for change of trim come solely from the pilot, the elevator force producer and the bellows. Furthermore, if the bellows should become inactive, the force producer alone, when opposed by stick forces, can change the length of link 55 under the pilot's control.

Figure 8:
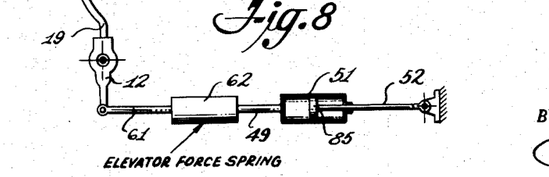
Figure 8 is a schematic diagram showing in simplified form another embodiment of the trim system in Figure 2.

It is also to be noted that the relative position of the force producer mechanism and trim cylinder 51 may be reversed without changing the invention. For example, in Figure 8 the force producer assembly in cylinder 62 is connected to the stick yoke 12 while the trim cylinder 51 is connected directly to the airframe. In this embodiment, trimming is accomplished by axially displacing the force producer assembly, by moving either the cylinder 62 or the operating rod 61, depending upon the end-for-end position of the force producer unit. In both cases, relative movement of the force producer cylinder 62 and the spring operating rod 61 takes place to relieve spring 81 compression, and the operation of the trim cylinder 51 in both cases changes the overall length of the composite link to change the pilot's control neutral as desired. The embodiment of Figure 8, however, does not provide for the inclusion of an aerodynamic stick force which will act in a manner as described above.

What is claimed is:

1. In an airplane having a control element connected to move a controlled device; a trim system comprising elastic centering means connected to the framework of said airplane, a linkage connected between said control element and said elastic centering means to apply restoring forces produced by said centering means to said control element to determine a neutral control element position predicated on the length of said linkage, said linkage being independent of the connection of said control element with said controlled device and comprising two relatively slidable telescopic-like members, and pilot-operated multiple-position locking and unlocking means operatively connected to said members to allow a change in length of said linkage in the proper direction automatically to relieve said restoring forces, whereby said control element assumes a new neutral position after unlocking and locking of said members by said pilot-operated means.

2. In combination with a control element of an airplane, a trim system comprising a spring casing, end caps sliding within said casing and restrained by said casing at the ends thereof, a spring positioned within said casing and bearing against said end caps, link means connected to said control element and to said end caps to move one or the other of said end caps in said casing against said spring in accordance with the direction of movement of said control element to create a neutral control element position predicated on the position of said casing in said airplane along the axis of said casing, a longitudinally extensible linkage capable of free extension and retraction under axial force connected between said casing and the framework of said airplane and pilot-operated control means operatively connected to said extensible linkage for both locking said extensible linkage as a solid unit and unlocking said linkage, independently of the position of said control element, to allow axial movement of said casing in said airplane in accordance with the direction of spring-applied force on said casing when said control element is moved away from said neutral position, whereby said control element is given a new neutral position after operation of said pilot-operated means.

3. In combination with an airplane control element connected to move a controlled device, a trim system comprising a spring casing, end caps sliding within said casing and restrained by said casing at the ends thereof, a spring positioned within said casing and bearing against said end caps, link means connected to said control element and bearing against said end caps to move one or the other of said end caps against said spring in accordance with the direction of movement of said control element to develop restoring forces determining a neutral control element position predicated on the length of said link means, said link means being independent of the connection of said control element with said controlled device, and comprising two relatively slidable telescopic-like members forming the respective ends of said link means and pilot-operated means operatively connected to said members for both locking together and unlocking said members, to allow a change in the length of said link means in accordance with the direction of spring-applied force on said link means when said control element is away from said neutral position, whereby said control element is given a new neutral position after operation of said pilot-operated means.

4. In combination with a control element of an airplane, a trim system comprising a spring casing, end caps sliding within said casing and restrained by said casing at the ends thereof, a spring positioned within said casing and bearing against said end caps, link means connected to said control element and to said end caps to move one or the other of said end caps in said casing against said spring in accordance with the direction of movement of said control element to create a neutral control element position predicated on the position of said casing in said airplane along the axis of said casing, and pilot-operated equilibrium-seeking means connected between said casing and the framework of said airplane to allow axial movement of said casing in said airplane in accordance with the direction of spring-applied force on said casing when said control element is moved away from said neutral position, whereby said control element is given a new neutral position after operation of said equilibrium-seeking means, said equilibrium-seeking means including a hydraulic cylinder and piston assembly having hydraulic lines connected between opposite sides of said piston to form a closed circuit, a valve connected in said circuit, and means for opening and closing said valve at will.

5. In combination with an airplane control element connected to move a controlled device, a trim system comprising a spring casing, end caps sliding within said casing and restrained by said casing at the ends thereof, a spring positioned within said casing and bearing against said end caps, link means connected to said control element and bearing against said end caps to move one or the other of said end caps against said spring in accordance with the direction of movement of said control element to develop restoring forces determining a neutral control element position predicated on the length of said link means, said link means being independent of the connection of said control element with said controlled device, and pilot-operated equilibrium-seeking means connected in said link means to change the length of said link means in accordance with the direction of spring applied force on said link means when said control element is moved away from said neutral position, whereby said control element is given a new neutral position after operation of said equilibrium seeking means, said equilibrium-seeking means including a floating hydraulic cylinder and piston assembly having hydraulic lines connected between opposite sides of said piston to form a closed circuit, a valve connected in said circuit, and means for opening and closing said valve at will.

6. In combination with a control of an airplane, an extensible link connected at one end to said control, elastic means connected between the other end of said extensible link and the structural framework of said airplane to exert restoring forces on said control toward a neutral control position determined by the length of said extensible link, said extensible link comprising a floating hydraulic piston and cylinder assembly having hydraulic lines connected between opposite sides of said piston to form a closed circuit, a valve connected in said circuit, and means for opening and closing said valve at will, independently of the position of said airplane control, whereby any of a plurality of neutral control positions can be obtained.

7. In a control system of an airplane, a pilot's control element connected to move an airplane control surface, elastic control element centering means, a linkage connecting said centering means to said control element independently of the remainder of said control system, said linkage including a hydraulic cylinder and piston, a hydraulic fluid path connecting the opposite sides of said piston, and means in said path for blocking or permitting flow between the opposite sides of said piston to respectively lock said linkage or permit change in length thereof.

8. Apparatus in accordance with claim 7 wherein remote control means is connected to said blocking means in said path, said remote control means leading to a location convenient to the pilot for operation thereby.

9. Apparatus in accordance with claim 7 wherein said elastic means is a spring.

10. Apparatus in accordance with claim 7 wherein said elastic means comprises force transmitting means connected to said linkage to bias said control element to a centered position dependent on the length of said linkage, when a force is applied to said transmitting means in a predetermined direction, and dynamic airflow-responsive force producing means connected to said force transmitting means, to apply force thereto in said predetermined direction varying with dynamic airflow past said airplane.

11. Apparatus in accordance with claim 7 wherein said elastic means comprises force transmitting means connected to said linkage to bias said control element to a centered position dependent on the length of said linkage, when a force is applied to said transmitting means in a predetermined direction, dynamic airflow-responsive force producing means connected to said force transmitting means, to apply force thereto in said predetermined direction varying with dynamic airflow past said airplane, and a spring connected to said force transmitting means to apply a force thereto in addition to the airflow-produced force, whereby a centering force is applied to said control element in the absence of said dynamic airflow.

12. In a control system of an airplane, a pilot's control element connected to move an airplane control surface, a trim control circuit connected between said control element and the structural framework of said airplane, said trim control circuit comprising an extensible linkage and an elastic means connected in series, said elastic means constructed to exert restoring forces on said control element toward a neutral control element position determined by the length of said extensible linkage, and said extensible linkage comprising a hydraulic piston and cylinder assembly having hydraulic lines connected between opposite sides of said piston to form a closed circuit, a valve connected in said closed circuit, and means for opening and closing said valve at will, independently of the position of said pilot's control element, whereby any of a plurality of neutral control element positions can be obtained.

13. In combination with an airplane surface control, a mechanical trim control circuit connected to said surface control, said trim control circuit comprising an elastic means and an extensible linkage connected in series, said elastic means constructed to center said surface control at a neutral control position determined by the length of said extensible linkage, and said extensible linkage including a hydraulic cylinder and piston, a hydraulic fluid path connecting the opposite sides of said piston, and means in said path for blocking or permitting flow between the opposite sides of said piston to respectively lock said linkage or permit change in length thereof, and operating means for said latter means operable independently of the position of said surface control, to close and open said path.

14. In an airplane having a pilot's surface control element, a trim control circuit connected between said control element and the structural framework of said airplane, said trim control circuit comprising an extensible linkage and an elastic means connected in series, said elastic means constructed to exert restoring forces on said control element toward a neutral control element position determined by the length of said extensible linkage, and said extensible linkage comprising two relatively movable telescopic-like members forming opposite respective ends of said linkage, and variable-position locking means operatively connected to said members for locking and unlocking said members independently of the position of said pilot's control element, to respectively prevent or permit relative movement of said two members, whereby unlocking of said members allows said control element to be moved relative to one end of said elastic means to obtain a new neutral control element position upon relocking of said members.

15. In an airplane having a pilot's surface control element, a trim system comprising an extensible linkage and an elastic centering means connected in series between said control element and the structural framework of said airplane, said extensible linkage comprising two relatively movable telescopic-like members forming opposite respective ends of said linkage, and remote-operated variable-position coupling means operatively connected to said members for locking and unlocking said members, independently of the position of said pilot's control element, to respectively prevent or permit relative movement of said two members, whereby unlocking of said members allows said control element to be moved relative to one end of said elastic centering means to obtain a new centered control element position upon relocking of said members.

16. In an airplane having a control element connected to move a control surface, an extensible link connected at one end to said control element, airflow-operated means connected to the other end of said extensible link to produce centering forces on said control element in accordance with the dynamic airflow produced in flight of said airplane, said centering forces determining a neutral control element position in accordance with the length of said extensible link, said extensible link comprising a floating hydraulic piston and cylinder assembly having hydraulic lines connected between opposite sides of said piston to form a closed circuit, a valve connected in said circuit, and means for opening and closing said valve at will, independently of the position of said control element, whereby any of a plurality of neutral control element positions can be obtained.

17. In a control system for an airplane, a pilot's control element connected to move a control surface, a trim control circuit connected between said control element and the structural framework of the airplane, said trim control circuit comprising a coupling means and an elastic means connected in series, said coupling means comprising two members engageable in a multiplicity of relative coupled positions, said elastic means constructed to exert restoring forces on said control element toward a neutral control element position determined by the relative coupled position of said members, and means connected to said members for freely disengaging and re-engaging said members at will, whereby any of a plurality of neutral control element positions can be obtained.

18. In an airplane having a pilot's surface control element, a trim control circuit connected between said control element and the framework of the airplane, said trim control circuit comprising a coupling means and an elastic means connected in series, said coupling means comprising two members engageable in a multiplicity of relative coupled positions, said elastic means constructed to exert restoring forces on said control element toward a neutral control element position determined by the relative coupled position of said members, and means connected to said members for freely disengaging and re-engaging said members at will, whereby any of a plurality of neutral control element positions can be obtained.

19. In an airplane, a pilot's control element connected to a control surface actuating system, a trim control system connected between said control element and the solid framework of the airplane, said trim system comprising elastic control element centering means, means for disconnecting said elastic centering means, whereby said centering means is free to assume its center position independently of the position of said control element relative to said framework, said disconnecting means being reversibly operable to reconnect said centering means at whatever relative position said control element may be in.

20. Apparatus in accordance with claim 19 wherein said elastic centering means comprises a two-way spring assembly, and wherein said disconnecting and reconnecting means is connected between said control element and said spring assembly.

21. Apparatus in accordance with claim 19 wherein said elastic centering means comprises a two-way spring assembly, and wherein said disconnecting and reconnecting means is connected between said spring assembly and said framework.

22. In an airplane control system for moving an attitude control surface, an irreversible motor connected to move said surface, motor control means, a pilot's control element connected to said motor control means to move said surface without feedbacks therefrom to said pilot's control element, elastic centering means normally connected to said pilot's control element to determine the neutral position thereof corresponding to the neutral position of said attitude control system, and means for freely disconnecting and reconnecting said elastic centering means from and to said pilot's control element at will, to allow automatic adjustment of said elastic centering means to a new desired neutral position.

References Cited in the file of this patent

UNITED STATES PATENTS

| Number | Name | Date |
| --- | --- | --- |
| 1,671,081 | Miller | May 22, 1928 |
| 1,976,479 | Butler | Oct. 9, 1934 |
| 2,001,988 | Temple | May 21, 1935 |
| 2,372,214 | Loepsinger | Mar. 27, 1945 |
| 2,373,575 | Lemonier | Aug. 10, 1945 |
| 2,405,377 | Sturgess et al. | Aug. 6, 1946 |
| 2,445,343 | Tyra | July 20, 1948 |
| 2,559,047 | Porter | July 3, 1951 |
| 2,583,828 | Gerstenberger | Jan. 29, 1952 |

FOREIGN PATENTS

| Number | Country | Date |
| --- | --- | --- |
| 524,701 | Germany | May 12, 1931 |